Aug. 13, 1968    H. V. RYGIOL    3,396,888
WIRE FEEDER
Filed Sept. 15, 1966    2 Sheets-Sheet 1
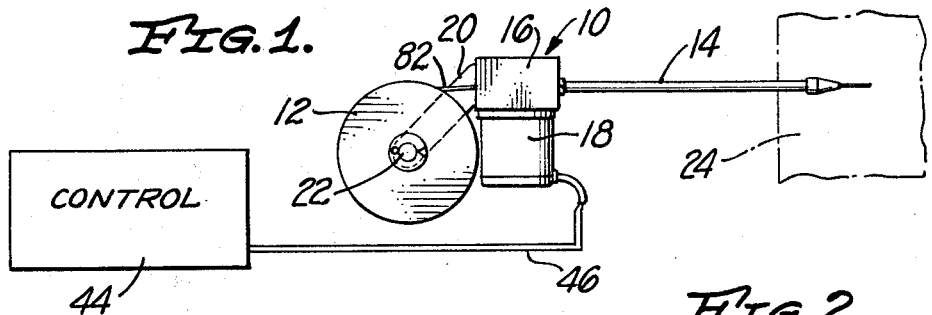
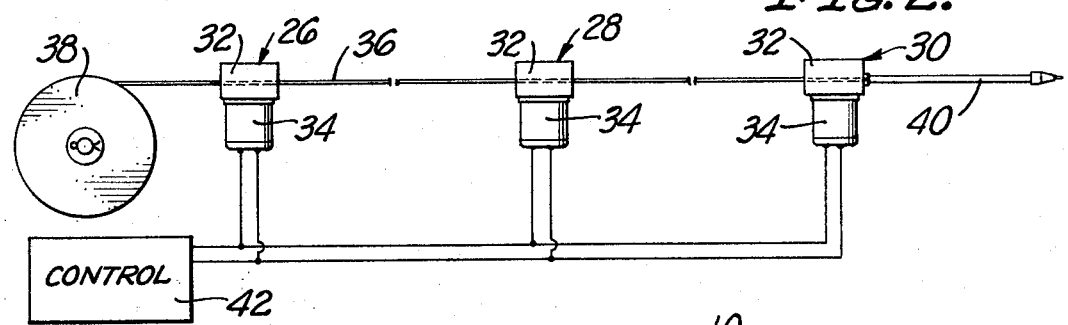
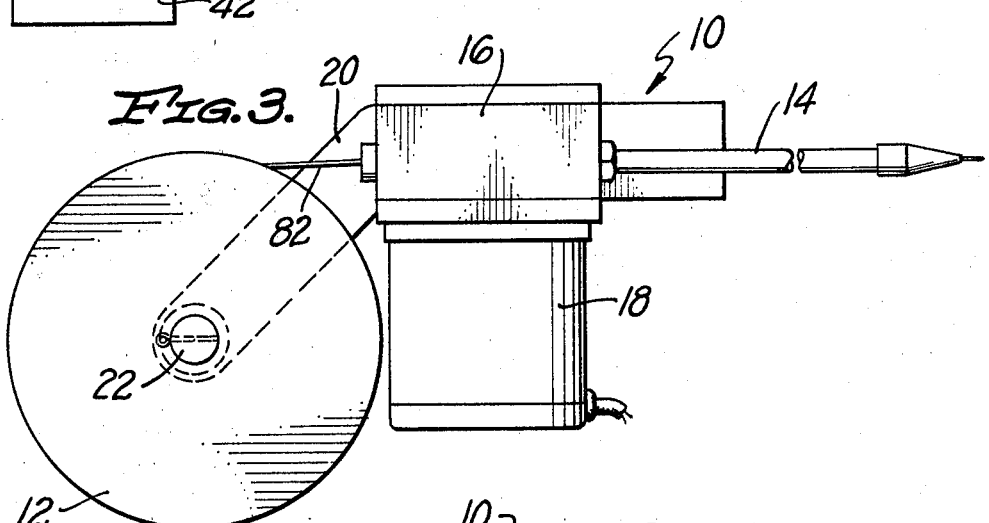
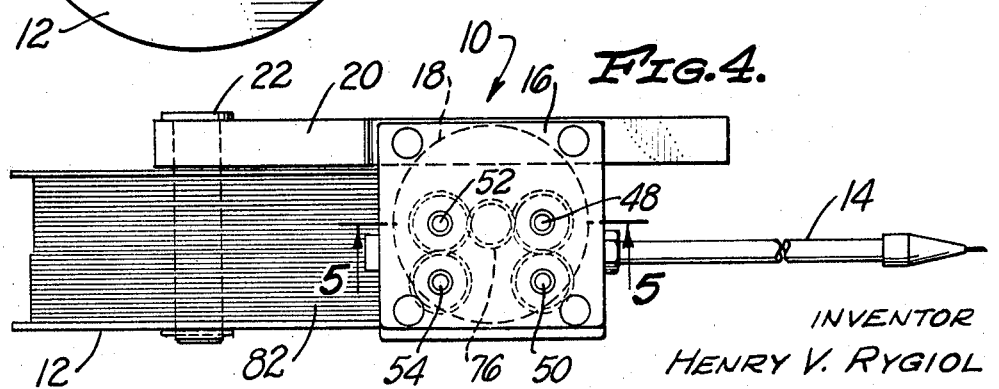
INVENTOR
HENRY V. RYGIOL
BY
EDWARD D. O'BRIAN
ATTORNEY

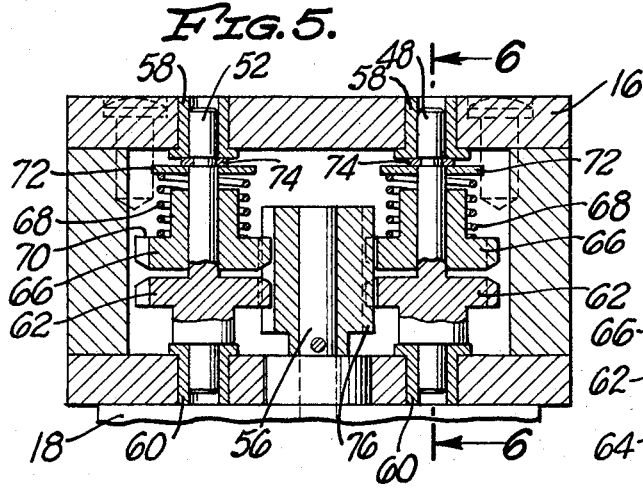
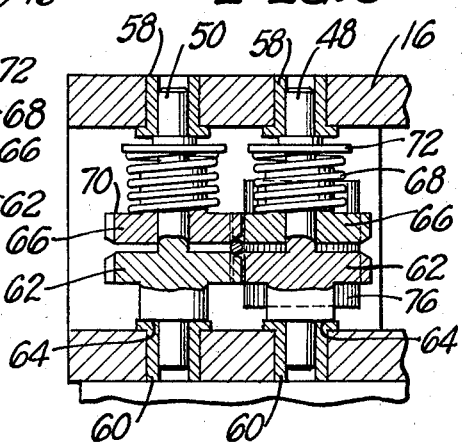
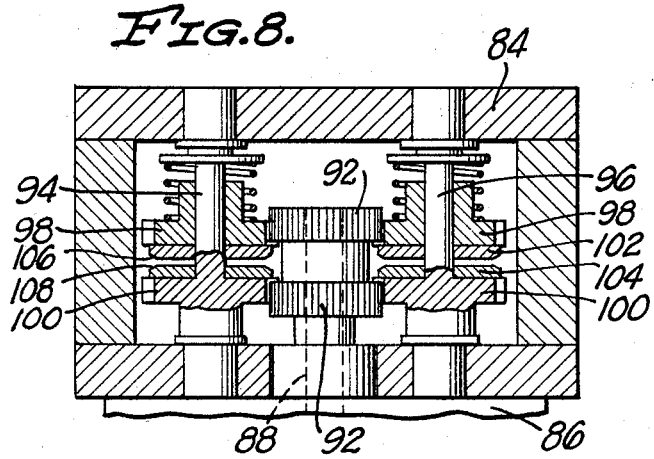
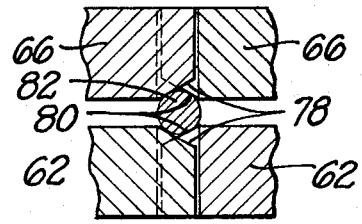
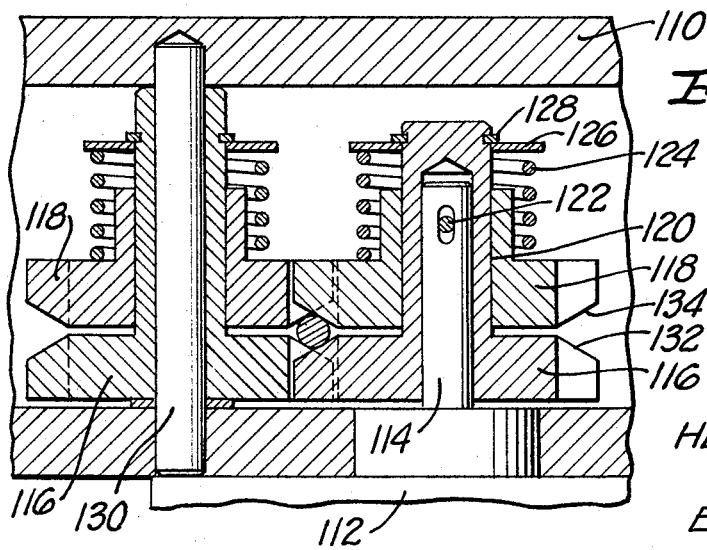

United States Patent Office

3,396,888
Patented Aug. 13, 1968

3,396,888
WIRE FEEDER
Henry V. Rygiol, Whittier, Calif. (12000 Rivera Road,
Santa Fe Springs, Calif. 90670)
Filed Sept. 15, 1966, Ser. No. 579,618
10 Claims. (Cl. 226—134)

ABSTRACT OF THE DISCLOSURE

This invention is directed to a wire feeder and particularly to a wire feeder which exercises such control over the wire it feeds that it is particularly suitable for extremely delicate and accurate wire feeding operations, such as the feeding of welding wire to a welding head.

---

The wire feeder of this invention has motive means and wire drive means. The motive means is directly connected to the wire drive means so that response delays caused by inertia are minimized. Furthermore, the motive means is preferably a step-type digital motor which rotates one increment upon the reception of each pulse, and in a direction in accordance with the character of pulse. A control means, not part of this invention, supplies the correct pulses at the correct frequency for the desired rate of wire feeding. The wire feed means comprises at least a first gear which is directly driven by the motive means. A second gear is alternatively driven in the several modifications of this invention either by the shaft of the first gear or by the motive means. Third and fourth gears are respectively driven by the first and second gears. The first and the third gears are axially movable and are axially urged respectively toward the first and third gears by means of a suitable spring force. The actual wire drive is accomplished by drive surfaces on drive elements on these gears. The drive elements may be formed as part of the gears at the teeth thereof, to define serrated conical drive surfaces or be formed on drive discs on the faces of the gears so as to define smooth conical drive surfaces. The loading of the gears together, by means of the springs, loads the drive surfaces so that adequate drive force is obtained between the drive surfaces and the wire while minimum radial thrust is created upon the bearings which carry the gears. The angularity of the conical drive surfaces control the amount of force the springs produce at the drive faces and divides the load between axial spring-load, and radial bearing load.

This construction provides a very accurate drive between the gears and the wire. Furthermore, this drive can be used in pairs from the same drive motor so as to produce even less chance of slip between the wire and the drive motor. The use of an accurate motor, which responds by rotation accurately in accordance with its signal provides a wire feeder which is extremely accurate. Such motors are known and respond with a particular angular displacement for each pulse input. Thus, a control which produces both at the rate at which wire is needed produces very accurate wire control. Since this accuracy between pulse driven drive motor and actual wire feed is precise, a series of such wire feeders may be used along the length of a wire so that a long length of wire can be fed from a large, fixed spool.

Background

The presently known wire feeders used for feeding wire to welding heads, and for similar uses, do not provide the required accuracy for today's precise welding requirements. Wire feed has been erratic and this has been caused by these feeders which did not supply an accurate quantity of wire in accordance with drive rotation. Various different kinds of structures have been made, and each previous attempt has not been sufficiently accurate to satisfy the need, which this invention fills. Precision is required in such feeding, but such has not been available. Furthermore, the prior wire feeder had such poor drive contact between the drive rolls and the wire that only a very short length of wire could be fed between the drive rolls and the point of use. The positive drive of the present wire feeder structure overcomes this difficulty.

Description

Accordingly, it is an object of this invention to provide a wire feeder which provides such positive engagement between the drive surfaces and the wire to be driven that accurate wire feeding is accomplished. It is a further object of this invention to provide a wire feeder which is capable of being employed with either soft or hard wire, and to provide the proper drive surfaces for each of these wire types. It is another object of this invention to provide a wire feeder which so firmly engages and accurately drives wire to be fed that a relatively long length of wire can be fed by it, and since a relatively long length of wire can be fed by each wire feeder, and the wire fed is very precise with respect to the signal to the drive motor, a plurality of such wire feeders can be used in series. It is still another object of this invention to provide a wire feeder which employs eight gears, all of which are driven and which gears each have a drive surface thereon and operate together to define a zone through which wires can be feed, which zone is of such dimension so to readily accept a plurality of different wire sizes so that a single structure may be employed to successively feed wires of different sizes without any changes of a mechanism so that the mechanism has a wide utility without adjustment. It is a further object of this invention to provide a wire feeder which is of high quality, but economic construction so that the wire feeder of this invention may be economically employed in a large number of applications and provide a useful, long, trouble-free life. Other objects and advantages of this invention will become apparent from the following portion of this specification, the claims and the attached drawings.

FIG. 1 is a schematic side elevational view showing the wire feeder of this invention as related to its control source, its wire source and the place to which the wire is delivered.

FIG. 2 is a similar figure showing several of the wire feeders of this invention in series for feeding wire over a relatively long distance.

FIG. 3 is an enlarged side elevational view showing the wire feeder of FIG. 1.

FIG. 4 is a top plan view of the wire feeder of FIG. 3.

FIG. 5 is a longitudinal section taken generally along the line 5—5 of FIG. 4 through the drive gearing of the preferred embodiment of the wire feeder of this invention.

FIG. 6 is a section taken along the line 6—6 of FIG. 5.

FIG. 7 is an enlarged, partial sectional view showing the engagement between the teeth on the drive gears and their drive surfaces with wire.

FIG. 8 is a section similar to FIG. 5, showing another embodiment of the wire feeder of this invention.

FIG. 9 is an enlarged transverse section through a third embodiment of the wire feeder of this invention.

Referring now to the drawings, and particularly to FIGS. 1, 3, and 4, the wire feeder of this invention is generally indicated at 10. The wire feeder 10 has a wire supply spool 12 and a wire outlet guide tube 14.

The wire feeder 10 comprises frame 16, in which the drive structure is located and drive motor 18 which is operatively connected through this drive structure to advance the wire. Bracket 20 is mounted on the side of frame 16. Bracket 20 carries pivot pin 22 upon which supply spool 12 is mounted. Furthermore, bracket 20 extends forward next to outlet guide tube 14 and serves as a means to mount the entire wire feeder structure 10 upon a suitable mounting means adjacent the use point of the wire feed by feeder 10. Customarily, wire feeder 10 is mounted upon a welding machine adjacent a welding head. The welding head may be either gas fired or electrically energized. Furthermore, the welding head may be enclosed with a suitable gas atmosphere, or it may be open to the atmosphere with or without gas shielding of the welding arc. Such are all conventionally known, and form no part of this invention, except for the fact that wire feeder 10 feeds wire to the welding point. A welding chamber is generally indicated at 24 to indicate that the wire supplied by feeder 10 is conventionally so used. However, where there are other applications for the accurate feeding of wire, the feeder may be used.

Control 44 is connected by cable 46 to motor 18. Control 44 emits a series of pulses in accordance with the requirement to feed wire. The control may be controlled directly from the fixture which moves the piece to be welded with respect to the welding head at chamber 24 or may be controlled by the character of the arc, when the arc character varies with the need for wire. In any event, control 44 produces pulses at a rate corresponding to the required wire feed. Drive motor 18 responds to these pulses and rotates an accurate angular amount for each of these pulses. The wire feeder in frame 16 is directly coupled to motor 18 and thus rotates a corresponding amount. The accurate wire feed produced by the wire feed mechanism in turn responds to this rotation and feeds the exactly required amount of wire.

Referring to FIG. 2, another use of the wire feeder of the type indicated at 10 is shown. Wire feeders 26, 28, and 30 are identical and are virtually identical to the wire feeder 10. Each of the wire feeders 26, 28, and 30 have a frame 32 in which the wire feeding structure is enclosed, and a drive motor 34 which energizes this wire feeding structure. In view of the fact that the wire feeding structure is so accurately responsive in wire feeding to the input signals to the drive motor, the plurality of wire feeders 26, 28, and 30 are serially mounted to drive a single wire 36 from spool 38 to outlet guide tube 40. In such circumstance, since wire can be fed by these feeders over a relatively long distance, and as great a plurality as desired can be used, the spool 38 may be a relatively large size and relatively permanently mounted, while still maintaining flexibility or movability to outlet guide tube 40. Wire feeder control 42 supplies a series of pulse signals, and each corresponding to an increment of wire feed and each of the motors 34 on the wire feeders 26, 28, and 30 responds by feeding an identical amount of wire. By means of this accurate feeding construction, such a serial application is possible.

Referring to FIGS. 4, 5, 6, and 7, the preferred embodiment of the wire feeder is shown therein. As is seen in FIG. 4, there are four shafts for gate 50, 52, and 54 therein. These shafts are arranged parallel to motor shaft 56. Motor shaft 56 extends into the case, and motor 18 is mounted directly onto and against frame 16. Each of the shafts 48 through 54, and the structures carried thereon, are identical. As is seen in FIGS. 5 and 6, shafts 48 through 54 are mounted on upper bushings 58 and lower bushings 60 for rotation. These bushings also carry thrust faces to carry the spring load produced by the structures mounted upon the shafts. Lower gears 62 may be integrally formed with the several shafts, or may be secured thereto. Lower gears 62 have a thrust face 64 which bears against the thrust face of bushings 60. Upper gears 66 are mounted for vertical sliding motion and are otherwise free upon shaft 48. Springs 68 are compression springs and engaged against the upper thrust face 70 of gears 66. Springs 68 bear on the upper end upon spring washers 72 and the spring washers 72 in turn bear upon snap rings 74 which are engaged in suitable grooves in each shaft. The spacing between the upper surface of snap rings 74 and thrust faces 64 of the lower gears 62, is slightly less than the dimension between the thrust faces of the bushings 58 and 60. Thus, there is very slight vertical play of the shafts in their bushings, but the entire thrust load of springs 68 is taken up by shafts 52 without being transmitted to their respective bushings. It is clear that the thrust force created by the spring 68 causes closing of the gears 62 and 66 with respect to each other.

From FIGS. 4, 5, and 6 it is apparent that lower gears 62 and upper gears 66 upon shafts 48 and 52 are all in engagement with pinion 76 which is secured to motor shaft 56. Furthermore, the gears 62 and 66 on shaft 50 are in respective engagement with gears 62 and 66 on shaft 48 and gears 62 and 66 on shaft 54 are in respective engagement with gears 62 and 66 on shaft 52. Since the gears on both shafts 48 and 52 are all in engagement with motor pinion 76, and the remaining gears are all in engagement with them, it is clear that all gears rotate together. Furthermore, since the pitch diameters are equal on all of the gears, they rotate the same angular amount.

FIG. 7, an enlarged partial section, shows the manner of interengagement of the gear teeth and showing the drive surfaces on the several gears. Drive surfaces 78 are formed upon the gears on shaft 50 and drive surfaces 80 are formed on the gears on shaft 48. These drive surfaces are formed as cones about the axis of rotation of the gears. The cones are truncated at the gear faces so that the entire conical area is the tooth area. The particular cone angle can be chosen from several points of view. The steeper the cone angle, the more effective the driving force. However, with steeper cone angles, with respect to the cone axis, the variation in wire diameter which can be accommodated by any particular set of gears is decreased. Furthermore, some cone angle must be used, rather than simply the flat gear face, in order to define the passage for wire 82. The preferred angle is an angle from the axis to the cone face of 62½°. This angle provides a radial bearing load which has approximately only half of the actual radial force of the drive surface upon the wire. Furthermore, with this angle wire diameter may vary in a ratio of approximately 4 to 1. For example, for a particular set of gears the drive surfaces may be suitable for a minimum wire size of .020 inch, and for this particular set any wire from that size up to about .080 inch diameter can be successfully fed. Thus, a wide range of wires may be fed without changing the gears. The construction of drive surfaces 78 and 80 as being separated by the actual gear teeth is desirable for use in the feeding of hard wires. The teeth effectively cut or segregate the drive surface into a plurality of individual surfaces around the circumference of the gears so that some edge engagement between the tooth edges and the drive surfaces aids in the feeding of hard wires.

However, this construction is not desirable for the feeding of soft wires, for soft wires are marked upon their surface by such edges. This marking decreases the feedability of the wire, causes wear on the interior of outlet tube 14, and in severe cases may effect the usability of the wire in welding. Furthermore, when the wire feeder is used for feeding wire for other mechanical purposes, this surface marking of the wire may be very undesirable. To eliminate such marking in the feeding of soft wires, the embodiment of FIG. 8 is used.

Referring to FIG. 8, frame 84 is identical to frame 16. It supports motor 86 which has drive shaft 88. Instead of a single pinion fixed to drive shaft 88, a divided pinion having pinion faces 90 and 92 is provided. This construction is identical to the pinion 76, except for the fact that the center of the teeth are relieved. Shafts 94 and 96 each carry upper gear 98 and lower gear 100. These are identically arranged to the gears 62 and 66, and have the same spring thrust arrangement to urge them together.

The gears are arranged for respective engagement with pinion faces 92 and 90, and with similar gears on adjacent shafts, similar to the shafts 48, 50, 52, and 54. The only basic difference in construction is the fact that the facing faces of gear 98 and 100 are flat, and these faces respectively carry drive cones 102 and 104. Drive cones 102 and 104 have drive surfaces 106 and 108 respectively which are again in the form of truncated cones. The angle is preferably the same as the angle upon drive surfaces 78 and 80. The diameter of drive cones 102 and 104 is such that they run in virtually edge to edge relationship with the corresponding drive cones on the adjacent shafts. Thus, they virtually meet at the pitch diameter of their respective gears. The drive cones are fixed to their respective gears so that they rotate therewith. Drive cones 102 and 104 preferably have hard drive surfaces 106 and 108 so as to reduce wear. These drive surfaces act together to define a passage for passage and engagement of the wire to be fed, and spring loaded together for adequate wire driving force. In view of the fact that the wire is soft, sufficient surface deformation takes place on the wire that adequate driving force is obtained and the amount of wire feed directly corresponds to the rotation of drive shaft 88 of motor 86. Motor 86 is preferably a pulse operated type, identical to motor 18.

The embodiments described above describe a wire drive structure which comprises two places of wire drive axially upon the length of wire being fed. Such is preferable for exact wire feed. It must also be noted that the path of wire feed is upon the pitch diameter of the gears in each case so that accurate feeding is easily calculated and the position of the wire with respect to the pitch diameter of the gears is accurately maintained.

In cases where the wire feeding resistance is not so great, the embodiment of wire feeder shown in FIG. 9 can be employed. Referring to FIG. 9, the wire feeder of this embodiment has frame 110 which carries motor 112. Motor 112 has a drive shaft 114 which rotates in accordance with the signal sent to the motor. Gear 116 is a lower gear fixed to shaft 114. Upper gear 118 is axially slidably mounted upon the exterior of shaft 120 which is integrally formed gear 116. Pin 122 is fixed in gear 118 and is positioned in a longitudinal slot in shaft 114 so that gear 118 rotates with the shaft, but is axially slidable therewith. Compression spring 124 engages against the upper face of gear 118 and against thrust washer 126. Thrust washer 126 engages against snap ring 128 engaged in a suitable groove in shaft 120. Thus, all axial thrust is accommodated between the several shafts without being transmitted to rotating bearings.

The construction on shaft 130 is similar to the construction on motor drive shaft 114, except for the fact that shaft 130 is fixed in frame 110 and lower gear 116 is freely rotatable on shaft 130. Again, lower gears 116 and upper gears 118 are respectively in mesh so that all gears move together. Furthermore, gears 116 and 118 have drive surfaces 132 and 134, in the form of truncated cones in the area of the actual teeth to define a wire feeding zone between the teeth of all four gears.

The conditions of the driving surfaces are optimum, the manner in which the driving surfaces interengage and cooperate so as to define a wire feeding path are optimum, the spring loading with the reactions taken up entirely within the individual gear pairs is desirable, the limited radial bearing loads and the driving of all gears are desirable and these features clearly result from a structure which accurately feeds wire in accordance with the rotation of the drive shaft. The preferable use of a pulse responsive motor makes wire feeding entirely responsive to the pulses received by the motor.

This invention having been described in its preferred embodiment, and several additional embodiments also described, it is clear that the wire feeder of this invention is susceptible to numerous modifications and embodiments within the scope of this invention and without the exercise of the inventive faculty. Accordingly, the scope of this invention is defined by the scope of the following claims.

I claim:
1. A wire feeder, said wire feeder comprising:
a frame;
first and second shafts mounted in said frame, said first and second shafts each having an axis, said axes of said first and second shafts being substantially parallel to each other and being spaced from each other;
first and second gears mounted on said first shaft and third and fourth gears mounted upon said second shaft, said first and second gears having adjacent faces facing each other and said third and fourth gears having adjacent faces facing each other, said first and third gears being in gear tooth engagement with each other and said second and fourth gears being in gear tooth engagement with each other, conical drive surfaces on each of said gears, said conical drive surfaces being adjacent each other and defining a wire path for wire to be fed, said wire path being between said shafts.

2. The wire feeder of claim 1 wherein said first and second gears are urged toward each other, and said third and fourth gears are urged toward each other.

3. The wire feeder of claim 2 wherein a spring is mounted with respect to said first and second gears so as to urge said adjacent faces of said first and second gear toward each other and a spring is mounted with respect to said third and fourth gears so as to urge said adjacent faces of said third and fourth gears toward each other, said drive surfaces being arranged so that when said adjacent faces move toward each other, said respective drive surfaces move toward each other.

4. The wire feeder of claim 3 wherein said first gear is fixed on said first shaft and said third gear is fixed on said second shaft, and wherein said second gear is axially slidably mounted upon said first shaft and said fourth gear is axially slidably mounted upon said second shaft.

5. The wire feeder of claim 4 wherein said second gear is irrotatably mounted with respect to said first shaft.

6. The wire feeder of claim 4 wherein said first and second gear are in engagement with a single pinion drive.

7. The wire feeder of claim 4 wherein said drive surfaces are conical and said drive surfaces intersect the teeth on said gears.

8. The wire feeder of claim 4 wherein said drive surfaces are continuous conical surfaces, away from the teeth of said gears.

9. The wire feeder of claim 2 wherein a motor is mounted to drive said gears, said motor being a digital pulse motor which rotates said gears a predetermined increment upon being energized with each pulse.

10. The wire feeder of claim 9 wherein a plurality of wire feeders are mounted in series and adapted to feed a single wire, each of the motors of each of said wire feeders being connected and parallel to a common pulse source.

References Cited

UNITED STATES PATENTS

| 2,904,168 | 9/1959 | Wall et al. | 226—184 X |
| 3,022,929 | 2/1962 | Myers et al. | 226—184 |
| 3,093,285 | 6/1963 | Leaming et al. | 226—184 |

ANDRES H. NIELSEN, *Primary Examiner.*

PO-1050
(5/69)

UNITED STATES PATENT OFFICE
CERTIFICATE OF CORRECTION

Patent No. 3,396,888      Dated August 13, 1968

Inventor(s) H. V. Rygiol

It is certified that error appears in the above-identified patent and that said Letters Patent are hereby corrected as shown below:

Column 3, line 59, "for gate" should be --48,--

SIGNED AND
SEALED
DEC 15 1970

(SEAL)
Attest:

Edward M. Fletcher, Jr.
Attesting Officer

WILLIAM E. SCHUYLER, JR.
Commissioner of Patents